June 21, 1938.  C. H. BROWN ET AL  2,121,067
DOUBLE CATHODE ELECTRON DISCHARGE DEVICE AND CIRCUITS
Filed Oct. 28, 1935   3 Sheets-Sheet 1

INVENTORS
CHARLES H. BROWN
WALTER VAN B. ROBERTS
BY
ATTORNEY

INVENTORS
CHARLES H. BROWN
WALTER VAN B. ROBERTS
BY
ATTORNEY

June 21, 1938.  C. H. BROWN ET AL  2,121,067
DOUBLE CATHODE ELECTRON DISCHARGE DEVICE AND CIRCUITS
Filed Oct. 28, 1935  3 Sheets-Sheet 3

INVENTORS
CHARLES H. BROWN
WALTER VAN B. ROBERTS
BY H. S. Grover
ATTORNEY

Patented June 21, 1938

2,121,067

UNITED STATES PATENT OFFICE 2,121,067

DOUBLE CATHODE ELECTRON DISCHARGE DEVICE AND CIRCUITS

Charles H. Brown, Brooklyn, N. Y., and Walter van B. Roberts, Princeton, N. J., assignors to Radio Corporation of America, a corporation of Delaware Application October 28, 1935, Serial No. 46,980

29 Claims. (Cl. 250—36)

This invention relates broadly to electron discharge device circuits, and more particularly to such circuits which employ cold cathode negative conductance devices functioning by means of secondary emission of electrons. Oscillation generators whose operation utilizes these elements will hereinafter be referred to as double-resonance oscillators.

Figure 1:
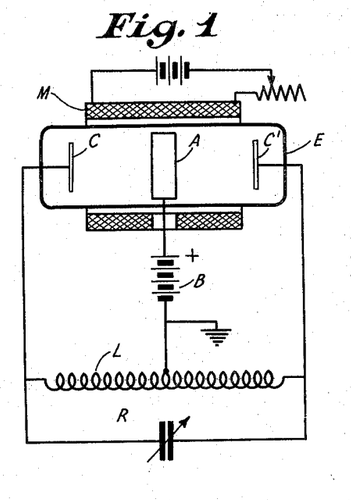
Fig. 1 shows diagrammatically a double resonance oscillator, given merely for the purpose of the foregoing exposition.

In order that the present invention may be better understood, an explanation will first be given of the operation of a double resonance oscillator, with special reference to Fig. 1 of the accompanying drawings which illustrates this type of oscillator. The figure discloses a tube which has an evacuated envelope E enclosing a centrally located anode A in the form of a ring, and a pair of cold cathodes C, C' oppositely disposed with respect to the anode A. Cathodes C, C' are treated, or specially designed, to emit copious secondary electrons when bombarded by other electrons, and are connected to the terminals of a resonant circuit R having an inductance L to whose midpoint is connected a battery B which maintains the anode A at a positive potential with respect to the cathodes. A coil M surrounds the envelope for producing a magnetic field perpendicular to the plane of the anode.

In the operation of the double resonance oscillator, an electron free to move in the envelope, produced by radio activity, thermal agitation, photoelectric effect, or otherwise, will be accelerated toward anode A. Assuming that this free electron starts from a position near the surface of cathode C, it will travel along the magnetic lines of force of the field toward C' but will be prevented by the field from striking ring-like anode A. The electron will pass through the hole of anode A after which it will now be decelerated until it reaches or fails to reach C' according to whether the potential of C' is positive or negative. The time required for the electron to travel from C to C' is determined by the geometry of the tube structure and by the potential of battery B. Assuming that this time is one hundred-millionth of a second, and cathodes C, C' are excited in opposite phase, either by shock excitation of the tuned circuit R or by an external alternating frequency source coupled to R, with a voltage whose frequency is fifty-million cycles per second and with an amplitude of fifty volts on each cathode, and that the electron previously considered arrives at C' at a moment when the potential of C' is positive and something like fifty volts, then the impact of the electron on cathode C' will dislodge a number of secondary electrons which will now be drawn back toward cathode C where they will arrive half a period (of the fifty megacycle frequency) later, that is, when C has become positive, thus dislodging a still greater number of secondary electrons, which will repeat the process of the first electron. This building up process continues until the space between electrodes contains so dense a cloud of electrons oscillating back and forth that in spite of the constraining magnetic field some of them are pushed over into the anode A, and equilibrium is established when the average absorption of electrons by the anode is equal to the net loss of electrons by secondary emission from the two electrodes C, C'. It will be observed that when one of the cold cathodes C or C' is positive, it suffers a net loss of electrons which constitutes a flow of current between the electrode and the resonant circuit contrary in direction to the flow that would be produced if the space within the tube were conductive in the ordinary fashion. In other words, the electrodes C, C' present a negative conductance to the terminals of the resonant circuit. As a result of this, energy is not absorbed from the resonant circuit by the tube, but is actually absorbed by the circuit from the tube. Hence, a tuned circuit as shown by R in Fig. 1, if started to oscillate sufficiently strongly at its natural frequency will continue so to do if it absorbs energy from the tube faster than it dissipates energy in its own resistance, that is, if the average negative conductance of the tube measured between cathodes C and C' exceeds the positive conductance of the tuned circuit R measured at resonant frequency between its two ends. In order to produce oscillations, the battery B must be adjusted to make the frequency of electron oscillation within the tube substantially equal to the natural frequency of the tuned circuit R, and it is for this reason that such an oscillation generator is herein named a double resonance device. Similarly, throughout this specification, the electrodes C, C' presenting negative conductance by virtue of secondary emission will be called dynodes, following the nomenclature of A. W. Hull who first produced negative conductance by means of secondary emission.

The present invention provides various improved double resonance oscillators and methods of operating same, and discloses, among other things, ways and means of modifying the operation of such oscillators, including the elimination of the guiding magnetic field, stabilizing the frequency of the generated oscillations preventing reaction upon the frequency of the generated oscillations due to the load, modulating the amplitude, phase, or frequency of the oscillations in highly efficient and economic manner, and so forth.

In the accompanying drawings wherein like numerals refer to like parts.

Figure 2:
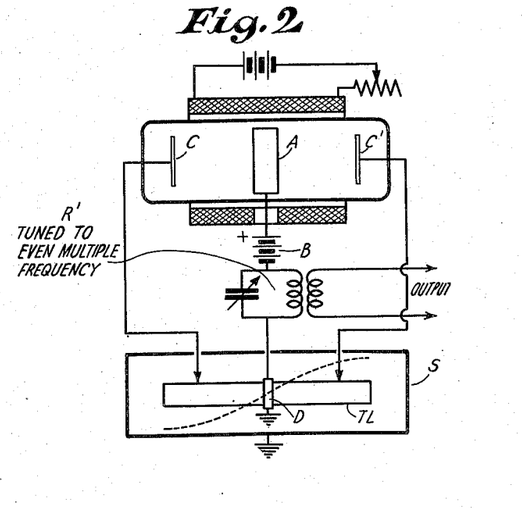
Figs. 2, 3 and 4 illustrate several embodiments in accordance with the invention for stabilizing the frequency of the generated oscillations.

Fig. 2 shows a highly stabilized double resonance oscillation generator provided with a resonant line TL which is substantially one-half wavelength long at the operating frequency for controlling the frequency of the generated oscillations. Line TL is mounted on insulated supports, not shown, within a concentric tubular conductor S which serves to shield the inner line and prevents undesired radiation therefrom. Anode A is connected to the midpoint D of line TL, herein indicated as a nodal point, through battery B and tuned circuit R', the latter of which is resonant to an even multiple of the oscillation frequency. Shield S is connected to ground, as is line TL at its nodal point D. Dynodes C and C' are coupled to line TL at points symmetrically located with respect to the midpoint D. Line TL acts electrically like a tuned circuit and the dynodes C, C' fluctuate out of phase with respect to each other at a radio frequency potential with respect to ground. The voltage distribution along the line is indicated by the dotted lines.

It is preferred that the resistance of line TL be low in order to give greater frequency stability than that of the usual tuned circuit, and this is accomplished by making the diameter of TL large. Since the anode circuit carries current of even harmonic frequencies, circuit R' is made resonant to an even multiple of the oscillation frequency. Output energy at the desired harmonic frequency may be obtained by coupling to this circuit, as shown in the drawings.

An advantage of the system of Fig. 2 is that resonant line TL because of its linearity, simplifies construction and lowers the cost of the system as compared to other forms of frequency controlling systems.

Figures 3, 4, 12:
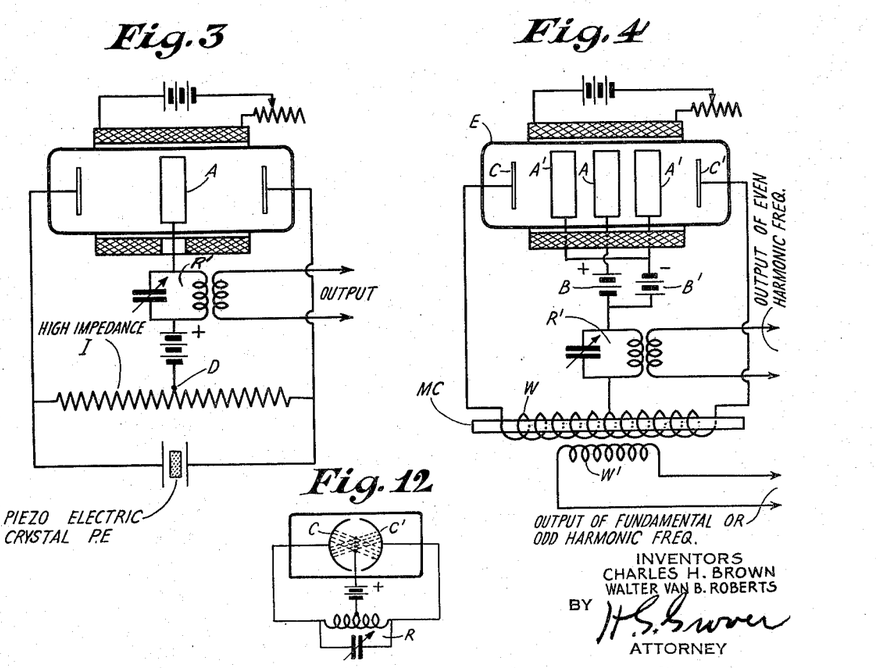
Figs. 10, 11 and 12 show different modifications of the resonance oscillator.

Fig. 3 illustrates another system in accordance with the invention for obtaining highly stabilized oscillations from the double resonance oscillator. Here a piezo electric crystal PE, shunted by a suitable impedance element I having high impedance to the oscillation frequency but providing a conductive path for direct current, replaces the usual tuned circuit shown in Fig. 1. The anode return path is connected to a midtap D on impedance I and may include a resonant circuit R' for providing output energy, as described in connection with Fig. 2.

One of thhe difficulties encountered in the usual types of negative resistance circuits when endeavoring to connect a negative resistance device to a crystal is that the usually necessary direct current path shunting the crystal is likely to cause instability if its impedance is high enough, or to unduly damp the crystal oscillations if its own impedance is not sufficient to cause instability when connected to the negative resistance. An advantage of the embodiment of Fig. 3 of the present invention is that in the double resonance oscillator the negative resistance property exists only at the frequency of electron oscillation and therefore no instability is caused by the high impedance shunt so long as its natural frequency is substantially different from the electron resonance frequency.

In Fig. 4, which is still another type of circuit for producing oscillations of improved frequency stability, there is employed an electromechanical vibrator in the form of a magnetic core MC wound with a coil of wire W which connects with the dynodes C, C'. Core MC is caused to vibrate by current passing through coil W, and by means of the magneto-striction principle controls the frequency of the oscillations generated by the tube. A second coil W' may be wound upon the core MC, and output energy of the fundamental frequency of oscillation or an odd harmonic thereof may be taken therefrom. For output energy of an even harmonic, resonant circuit R' may be used and the output coupled thereto, as shown.

Since magneto-striction oscillators are usually designed for lower frequency operation than piezo electric crystals and line resonators, there are provided within envelope E additional rings A', A' oppositely disposed with respect to anode A and located between it and the dynodes for increasing the time of flight of the electrons. Rings A', A' are maintained at a fixed potential, preferably negative, by an additional battery B', and in this way the electron oscillation frequency is reduced. The same effect, of course, may be accomplished to some extent by reducing the voltage applied to anode A by battery B.

One advantage of the arrangements of Figs. 2, 3 and 4 over known circuits of very generally similar structure is that the frequency determining circuits of these figures have resonant characteristics which are sharper than a tuned circuit having equivalent concentrated impedance elements.

Figure 5:
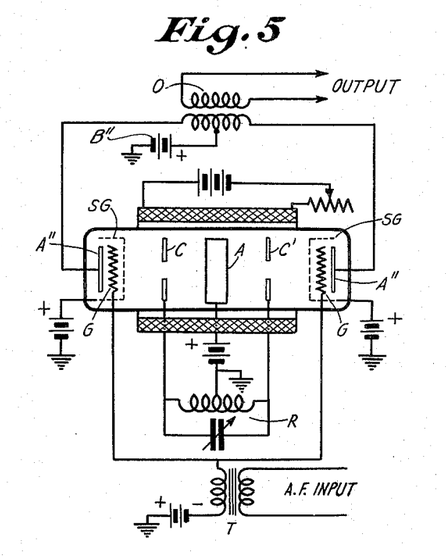
Fig. 5 illustrates another embodiment of the invention whereby modulation is achieved, and output energy taken from the tube without reaction upon the frequency of the generated oscillations.

Fig. 5 shows a double resonance oscillation generation system provided with means for modulating the amplitude of the generated oscillations, and an output circuit which is electron coupled to the frequency determining elements whereby there is obviated any possibility of reaction by the load upon the frequency of the generated oscillations. Dynodes C, C' are each provided with one or more perforations through which intermittent pulses of electrons flow to working anodes A", A" through screen grids SG and suppressor grids G. The work anodes A" are coupled to the output circuit O and are maintained at a positive potential by a battery B". Screen grids SG are maintained at a suitable positive potential and function to prevent electrostatic coupling from anodes A", A" to the inner oscillation circuit R which is connected between dynodes C, C'. Suppressor grids G serve to prevent such secondary electrons as may be emitted from anodes A" caused by bombardment, from landing on screen grids SG. Modulation, if desired, may be effected by impressing modulating voltages upon the suppressor grids G in parallel by means of an audio frequency signal applied to transformer T.

Figure 6:
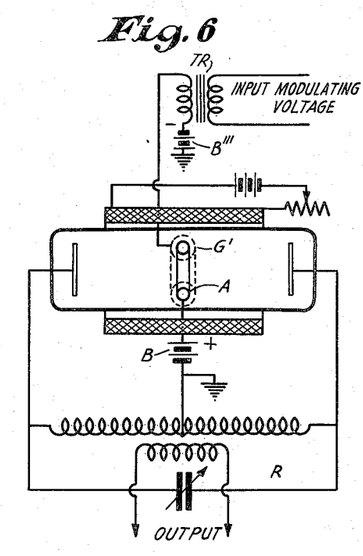
Figs. 6, 7, 8 and 9 illustrate various methods of modulating the double resonance oscillator and obtaining different frequencies in the output.

Fig. 6 illustrates a highly advantageous arrangement which requires much less power for modulating the oscillations produced in a double resonance system than other constructions. Here the collector anode A, which is in the form of a ring, is surrounded by another ring G' in the form of a grid, the latter of which is maintained at a suitable negative potential by a battery B'''. The effective potential of anode A is thus reduced, and its effective value is altered by varying the potential of grid G' by the application of a modulating voltage from the input circuit connected to it through an audio frequency transformer TR, as indicated. The battery voltage applied to grid G' is adjusted to a value such that the strength of oscillations may be increased or decreased in accordance with the direction of change of grid potential, that is, not to a point of maximum oscillation strength. Although the output is indicated as being coupled to resonant circuit R to obtain energy at a fundamental frequency, it will be appreciated that energy at double the fundamental frequency can be obtained by including in series with battery B a circuit tuned to such double frequency, in the manner indicated in Figs. 2 and 3, and coupling the output to said last tuned circuit.

Figure 7:
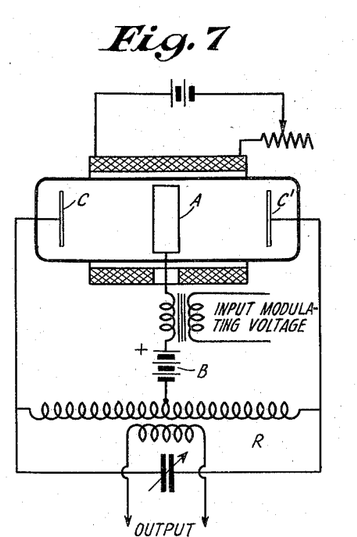

Fig. 7 illustrates another method by which the strength of oscillations may be modulated. As in Fig. 6, the battery voltage of B is adjusted not to a point of maximum oscillation strength, but to a point such that a change in voltage in one sense will increase the oscillation strength, and in the opposite sense decrease it. The input modulating voltage, backed up by as much power as necessary, is then impressed in series with battery B.

Figure 8:
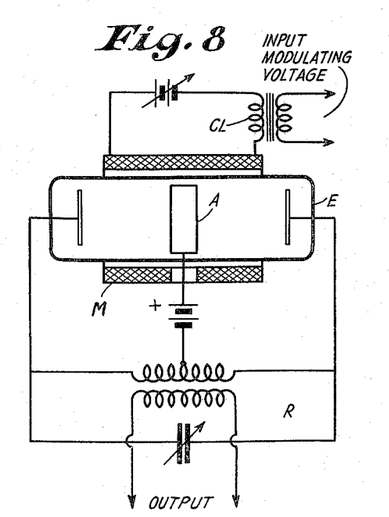

In Fig. 8 is shown a still different method of modulating the oscillations produced by the double resonance oscillator wherein the modulating signal from the input is passed through a coil CL which forms part or all of the field coil M. Since the strength of oscillation depends upon the magnetic field, a modulation of the magnetic field produces a modulation of the generated oscillations. If desired, there may be employed a separate coil surrounding envelope E and coil M, which may be employed for modulating the oscillations produced, instead of or in conjunction with the modulating circuit illustrated in Fig. 8.

Figure 9:
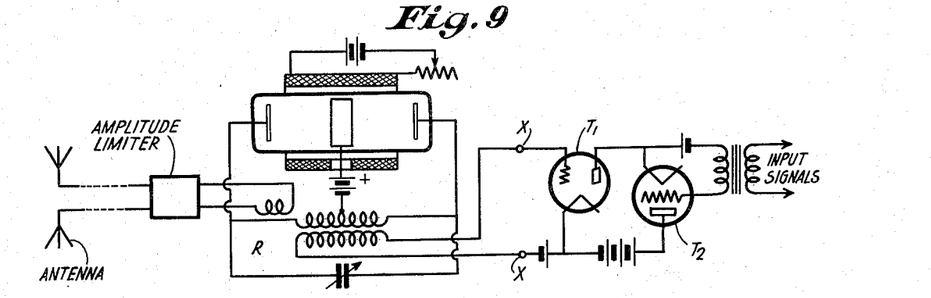

Fig. 9 is another embodiment of the invention and shows a double resonance oscillator adapted to be modulated in phase or frequency. This is accomplished by coupling the resonant circuit R to the input of an electron discharge device $T_1$ whose effective input capacity between terminals X—X is varied in accordance with signals as described in United States Patent No. 1,917,394, granted July 11, 1933, to Walter Van B. Roberts. This operation is briefly as follows: The effective input capacity of $T_1$ varies in accordance with the load resistance of the plate circuit (of $T_1$), and the resistance of the tube $T_2$ used as load resistance for tube $T_1$ is varied in accordance with the signals. Output may be taken in any of the ways shown in the previous figures, and may be passed through an amplitude limiter, if desired, and power amplifier, to any type of utilization circuit, such as an antenna.

Figure 10:
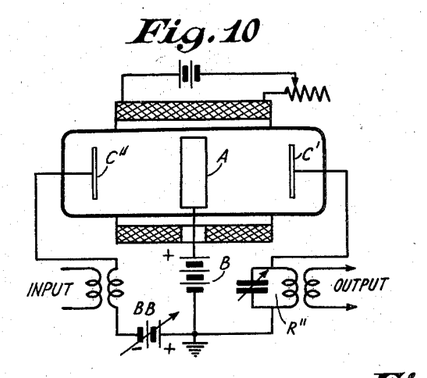

Fig. 10 shows a double resonance oscillator wherein the left hand electrode C'' is not used as a dynode. A separate source of potential BB maintains electrode C'' negative at all times so that electrons from dynode C' do not reach it. Electrode C' is then the dynode and in conjunction with tuned circuit R'', located between C' and anode A, maintains oscillations. The negative potential applied to C'' from battery BB, however, influences the frequency of electron oscillation, and consequently adjustments of electron frequency may be made by varying the bias of C'' rather than by varying the voltage of the anode battery B. It will be appreciated that in this figure the electrons can be made to oscillate over a portion of the distance between C'' and C' rather than the entire distance between these two electrodes merely by adjusting the negative potential on C''. With such an arrangement the production of harmonic frequencies will be intensified due to the fact that there will be approximately linear acceleration and deceleration in the space between the anode A and cathode C' but with much larger deceleration near the electrode C'', thus producing both odd and even harmonics. An input circuit may be used for impressing modulating potentials upon electrode C'', as shown. Such a modulating arrangement has the advantage of modulating the oscillations without drawing appreciable power from the modulation source, as described in connection with Fig. 6. Battery BB may, of course, be replaced by any suitable source of voltage for effecting the required bias effect on electrode C''.

Figure 11:
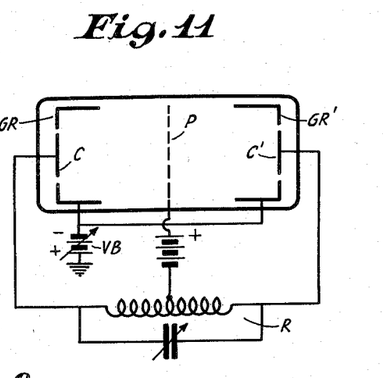

Fig. 11 illustrates a modification of the double resonance oscillator, in accordance with the invention, which requires no guiding magnetic field. The usual ring anode is here replaced by a screen or perforated plate P, and the dynodes C, C' are surrounded by guard rings GR, GR' maintained at a suitable potential, preferably somewhere near the average potential of the dynodes, by variable battery VB, so that the lines of electrostatic force from the dynodes C, C' to the collector anode P are substantially parallel. Screen anode P presents an area of solid matter which is so small relative to the area of the perforations that the collector P will receive (prior to the time when any considerable space charge is built up within the tube) a lesser proportion of electrons passing therethrough than the ratio of gain of electrons at each impact to the number before impact. That is, if we consider a certain number of electrons about to strike the right hand dynode C', the collector P must not receive as much as the total increase in number when the secondary electrons come back through it, otherwise the number of electrons oscillating within the tube would not build up. Best results will be obtained by using extremely fine wires for the collector electrode P and making the mesh as coarse as possible without upsetting the uniformity of the electrical field in the space between collector P and dynodes C, C'.

Fig. 12 discloses a further modification requiring no magnetic field. In Fig. 12 the dynodes or cathodes C, C' extend around a small fine grid structure, which may even be a single wire, as a surface which is somewhat spherical. The dotted lines indicate the paths of the electrons which are not now parallel as in the previous structures illustrated by Figs. 2 to 11, inclusive. The main thought behind Fig. 12 is that the lengths of the paths of electrons from one dynode to the other dynode are approximately the same, although there is a wide variety of these paths.

Figure 13:
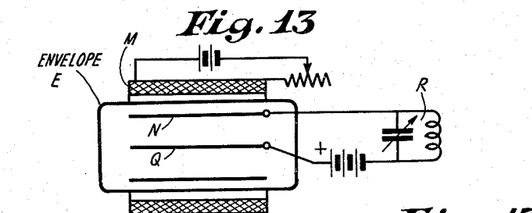
Figs. 13, 13a and 13b show a different form of double resonance oscillator.

Fig. 13 shows a different form of double resonance oscillator having a cylindrical dynode N, a thin wire collector Q along its axis, and a magnetic field parallel to the axis produced by coil M. Free electrons at the surface of the dynode N are attracted toward the collector Q which is maintained at a high positive potential, but are prevented from striking it by the curve introduced by the magnetic field. If the dynode N has a positive potential at the moment the electrons reach it, secondary electrons will be emitted and the process will continue cumulatively if the period of the dynode voltage is approximately equal to the time of flight of electrons from one part of the dynode to another. Thus a tuned circuit such as R will absorb energy rather than dissipate it, and hence maintain itself in oscillation. If the collector Q is made sufficiently small, initial velocities transverse to the radius will prevent most of the electrons from striking the collector so that the magnetic field M may be dispensed with.

Figure 13A:
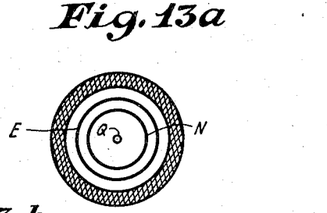

Fig. 13a shows a cross section of the tube of Fig. 13.

Figure 13B:
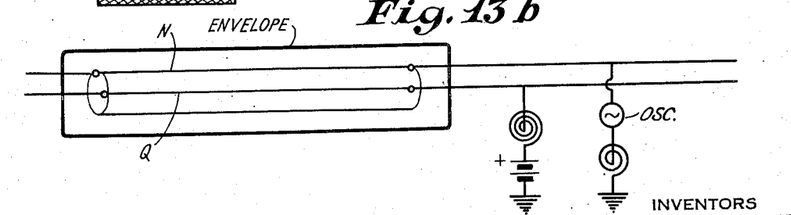

Fig. 13b shows a structure of similar cross section but elongated to act as a concentric transmission line which at the same time possesses a continuously distributed negative conductance for purposes more fully discussed in copending application, Serial No. 43,880, filed October 7, 1935, by Walter Van B. Roberts, to which reference is made. Central collector Q in this figure is maintained at a high positive potential so chosen that an increase of collector potential results in a decrease of collector current, (i. e., negative conductance is produced between electrodes), this being brought about by the impressing of sufficient voltage of the proper frequency relative to the steady voltage.

It will be evident, of course, that the systems of Figs. 5, 6, 7, 8, 9, 11 and 12 can be stabilized as to frequency of the generated oscillations merely by replacing the resonant circuit R shown in each of these figures by any of the mechanical resonators shown in Figs. 2, 3, and 4, in accordance with the teachings hereinabove set forth. It is also to be understood that in Figs. 5, 6, 7, 8, 9, 11 and 12 output energy of a fundamental frequency or odd harmonic may be obtained by coupling the load to resonant circuit R, or its equivalent, while output energy of an even harmonic may be obtained by coupling the load to a suitably tuned resonant circuit placed in series with the anode connection, both of which types are illustrated in Fig. 4.

Furthermore, the arrangements of the present invention may be used not only as generators of oscillations for transmitting or receiving purposes, but also as amplifiers, detectors, or electron multipliers. It is known that in a structure operating upon the principles underlying any of the figures, the anode current varies with the effective anode potential, passing through one or more maxima as the anode battery voltage is increased. If the anode battery voltage is adjusted to produce a maximum of anode current, then by the very definition of the word "maximum" it is evident that a change of anode voltage in either sense will reduce the anode current. This applies whether the cathodes or dynodes C, C' are excited from an external source of high frequency voltage or are maintained at a fluctuating potential by self-oscillation. The structures shown in Figs. 6, 10 and 11, for example, are particularly adapted to be used as detectors or amplifiers, inasmuch as the effective anode potential may be varied by varying the potential of a negatively biased electrode which does not draw current and hence does not absorb power. In Fig. 6 the negatively biased electrode is grid G', in Fig. 10 it is electrode C'', and in Fig. 11 it is the guard ring structures GR—GR'. If signal voltages, such as modulated radio frequency of a frequency preferably relatively low compared to the frequency of excitation of the cathodes, are impressed upon the negatively biased element, the anode battery being adjusted for a maximum anode current, the average anode current will be reduced by an amount dependent upon the strength of the signal voltage. This produces a component of anode current which may be called the rectified current.

On the other hand, if the anode battery is adjusted not to a point of maximum anode current but to a point where anode current increases with increasing anode voltage, then signalling voltages impressed upon the negatively biased electrode will cause changes of anode current in the sense that the more negative the control element the less the anode current and vice versa. This is exactly what occurs in an ordinary vacuum tube and hence the arrangement may be used as an amplifier in the same way as an ordinary tube. But, if the anode battery voltage is adjusted to a point where increasing voltage causes a decreased anode current, then the more negative the control element the larger the anode current, which state of affairs corresponds to an amplifier having a negative transconductance between the control grid and anode. A device having a negative transconductance is useful in producing oscillations and for other purposes known in the art, as well as for ordinary amplification.

Any of the circuits shown in the accompanying figures may be used for electron multiplication as follows: The oscillation or resonant circuit R may be replaced by a transformer secondary winding connected between the dynodes C, C', having voltage induced in it by a high frequency current from an external source passing through a primary coil coupled thereto. If now the anode battery voltage is adjusted so that the electron time of flight between the dynodes C, C' is not exactly equal to a half period of the exciting voltage, the secondary emission will not build up to any great extent from random electrons within the structure because the electron flow or oscillation will not long remain in step with the exciting voltage. However, if a beam of electrons is admitted to the structure, for example, through a hole in one of the cathodes or dynodes, there will be a certain number of round trips between the dynodes, each with an increase in the number of electrons passing back and forth, so that the anode current will increase in proportion to the strength of the incoming beam of electrons. This action constitutes the effect desired of an electron multiplier device. If instead of an output current proportional to the input electron stream, it is desired to have an output electron stream proportional to but greater than the input stream, a perforated electrode may be inserted in the tube to draw off electrons through the hole therein to form an electron stream to be utilized for whatever purpose desired.

Taking up some of the figures in detail, for example Figs. 11 and 12, the system of these figures can each be used as an electron multiplier merely by enabling a beam of electrons from an external source to enter the space between the two dynodes C, C' through an aperture in one of the dynodes. In such case, the resonant circuit between the dynodes C, C' may be replaced by an inductance to which will be coupled an oscillator functioning at a frequency in the range, let us say, between 10 to 100 megacycles. The midpoint of the inductance will be connected to the grid in the same manner shown in Figs. 11 and 12 to provide a positive potential thereto, and output energy will be obtained from the grid circuit by providing an impedance in the path between the grid and the midpoint on the inductance and tapping the output leads across this impedance. No magnetic field will be necessary in the systems of these two figures.

Fig. 10 can, with slight changes, be used either as a rectifier or as an amplifier. In Fig. 10, if radio frequency excitation is impressed on C' with a frequency related to the voltage B so that the battery current varies with battery voltage, then the battery current may be varied in accordance with signals impressed on the negative electrode C" and power may be derived from the battery or anode lead circuit. If the adjustment is such as to make the anode current a maximum, there will be a rectifying action, but if the adjustment is such that anode current changes are in a sense corresponding to the change of potential of electrode C", there will be a true repeating or amplifying action and the transconductance between C" and the anode circuit will be positive or negative according to the selection of exciting frequency and battery voltage. An advantage of such an arrangement is that little or no power is required to vary the potential of electrode C in accordance with incoming signals.

Similar reasoning applies to the system of Fig. 6, which can also be used as an amplifier and rectifier and wherein input signals are applied to grid G' instead of to electrode C" of Fig. 10.

What is claimed is:

1. The method of operating an electron discharge device oscillator which comprises creating an electron flow, directing said flow against a surface capable of emitting secondary electrons on impact, directing the resultant flow against a similar opposed surface, repeating such impacts at predetermined intervals between opposed surfaces, applying alternating current energy between said surfaces for stabilizing the frequency of oscillations, and deriving from said oscillator from an area between said surfaces energy of a frequency which is a multiple of the frequency of said alternating current energy.

2. In combination, an electron discharge device oscillator comprising an evacuated envelope containing an anode, and a pair of surfaces capable of emitting electrons on impact oppositely disposed with respect to said anode, a coil surrounding said envelope for producing a magnetic field parallel to the flow of electrons between said surfaces, a circuit including a mechanically vibrating element for stabilizing the frequency of oscillations, connections from said surfaces to terminals of said circuit which are symmetrically placed with respect to the electrical center thereof, and a connection including a source of potential from said electrical center to said anode, said source maintaining said anode at a positive potential relative to said surfaces.

3. In combination, an electron dicharge device oscillator comprising an evacuated envelope containing an anode, and a pair of surfaces capable of emitting electrons on impact oppositely disposed with respect to said anode, a coil surrounding said envelope for producing a magnetic field parallel to the flow of electrons between said surfaces, a frequency controlling element in the form of a straight conductor having a length substantially equal to half the length of the operating wave, a connection including a source of potential from said anode to the midpoint of said conductor, and connections from said surfaces to points on said conductor oppositely disposed with respect to said midpoint, said source maintaining said anode at a positive potential.

4. In combination, an electron discharge device oscillator comprising an evacuated envelope containing an anode, and a pair of surfaces capable of emitting electrons on impact oppositely disposed with respect to said anode, a coil surrounding said envelope for producing a magnetic field parallel to the flow of electrons between said surfaces, a frequency controlling element in the form of a line having uniformly distributed constants, and having a length substantially equal to half the length of the operating wave, a connection including a source of potential from said anode to the midpoint of said line, connections from said surfaces to points on said line oppositely disposed with respect to said midpoint, said source maintaining said anode at a positive potential, a concentric shield surrounding said line, and connections from the midpoint of said line and from said shield to ground.

5. In combination, an electron discharge device oscillator comprising an evacuated envelope containing an anode, and a pair of surfaces capable of emitting electrons on impact oppositely disposed with respect to said anode, a coil surrounding said envelope for producing a magnetic field parallel to the flow of electrons between said surfaces, a line having a length substantially equal to half the length of the operating wave, a connection including a source of potential from said anode to the midpoint of said line, and connections from said surfaces to points on said line oppositely disposed with respect to said midpoint, said source maintaining said anode at a positive potential, a resonant circuit tuned to an even multiple of the fundamental frequency in series with said source, and an output circuit coupled to said resonant circuit.

6. In combination, an electron discharge device oscillator comprising an evacuated envelope containing an anode, and a pair of surfaces capable of emitting electrons on impact oppositely disposed with respect to said anode, a coil surrounding said envelope for producing a magnetic field parallel to the flow of electrons between said surfaces, a piezo electric crystal directly connected between said surfaces for stabilizing the frequency of said oscillator, an impedance in shunt with said crystal, and a connection from the midpoint of said impedance to said anode including in series a source of potential for maintaining said anode at a positive potential relative to said surfaces.

7. In combination, an electron discharge device oscillator comprising an evacuated envelope containing an anode, and a pair of surfaces capable of emitting electrons on impact oppositely disposed with respect to said anode, a coil surrounding said envelope for producing a magnetic field parallel to the flow of electrons between said surfaces, a circuit comprising a mechanically vibrating core and a coil surrounding the core, connections from opposite terminals of said last coil to said surfaces, a connection from the midpoint of said last coil to said anode including a source of energy for maintaining said anode at a positive potential relative to said surfaces.

8. In combination, an electron discharge device oscillator comprising an evacuated envelope containing an anode, and a pair of surfaces capable of emitting electrons on impact oppositely disposed with respect to said anode, a coil surrounding said envelope for producing a magnetic field parallel to the flow of electrons between said surfaces, a circuit comprising a mechanically vibrating core and a coil surrounding the core, connections from opposite terminals of said last coil to said surfaces, a connection from the midpoint of said last coil to said anode including a source of energy for maintaining said anode at a positive potential relative to said surfaces, said anode being in the form of a ring, an additional ring on each side of said anode located between said anode and the adjacent surface, and means for biasing said additional rings negative with respect to said surfaces for increasing the time of flight of the electrons between said surfaces.

9. A system in accordance with claim 8, including means for obtaining any desired harmonic of the fundamental frequency from said oscillator.

10. The method of operating an electron discharge device oscillator which comprises creating an electron flow, directing said flow against a surface capable of emitting secondary electrons on impact, directing the resultant flow against a similar opposed surface, repeating such impacts at predetermined intervals between opposed surfaces, and mechanically stabilizing the frequency of oscillation.

11. In combination, an electron discharge device oscillator comprising an evacuated envelope containing an anode, and a pair of surfaces capable of emitting electrons on impact oppositely disposed with respect to said anode, a coil surrounding said envelope for producing a magnetic field parallel to the flow of electrons between said surfaces, a line having a length substantially equal to half the length of the operating wave, a connection including a source of potential from said anode to the midpoint of said line, connections from said surfaces to points on said line oppositely disposed with respect to said midpoint, said source maintaining said anode at a positive potential, a concentric shield surrounding said line, connections from the midpoint of said line and from said shield to ground, a parallel tuned circuit of inductance and capacity in series with said source, said parallel tuned circuit being resonant to a frequency which is an even multiple of the fundamental frequency, and an output circuit coupled to said parallel tuned circuit.

12. In combination, an electron discharge device oscillator comprising an evacuated envelope containing an anode, and a pair of surfaces capable of emitting electrons on impact oppositely disposed with respect to said anode, a coil surrounding said envelope for producing a magnetic field parallel to the flow of electrons between said surfaces, a circuit comprising a mechanically vibrating core and a coil surrounding the core, connections from opposite terminals of said last coil to said surfaces, a connection from the midpoint of said last coil to said anode including a source of energy for maintaining said anode at a positive potential relative to said surfaces, said anode being in the form of a ring, an additional ring on each side of said anode located between said anode and the adjacent surface, means for biasing said additional rings negative with respect to said surfaces for increasing the time of flight of the electrons between said surfaces, and an output circuit comprising a third coil inductively coupled to said last coil for obtaining from said device oscillations of the fundamental frequency.

13. In combination, an electron discharge device oscillator comprising an evacuated envelope containing an anode, and a pair of surfaces capable of emitting electrons on impact oppositely disposed with respect to said anode, a coil surrounding said envelope for producing a magnetic field parallel to the flow of electrons between said surfaces, a circuit comprising a mechanically vibrating core and a coil surrounding the core, connections from opposite terminals of said last coil to said surfaces, a connection from the midpoint of said last coil to said anode including a source of energy for maintaining said anode at a positive potential relative to said surfaces, said anode being in the form of a ring, an additional ring on each side of said anode located between said anode and the adjacent surface, means for biasing said additional rings negative with respect to said surfaces for increasing the time of flight of the electrons between said surfaces, a parallel tuned circuit of inductance and capacity in series with said source, said parallel tuned circuit being resonant to a frequency which is an even multiple of the fundamental frequency, and an output circuit coupled to said parallel tuned circuit.

14. In combination, an electron discharge device oscillator comprising an evacuated envelope containing an anode, and a pair of surfaces capable of emitting electrons on impact oppositely disposed with respect to said anode, a coil surrounding said envelope for producing a magnetic field parallel to the flow of electrons between said surfaces, a piezo-electric crystal directly connected between said surfaces for stabilizing the frequency of said oscillator, a resistance having high impedance to the oscillation frequency in shunt with said crystal, and a connection from the midpoint of said resistance to said anode including in series a source of potential for maintaining said anode at a positive potential relative to said surfaces.

15. In combination, an electron discharge device oscillator comprising an evacuated envelope containing an anode, and a pair of surfaces capable of emitting electrons on impact oppositely disposed with respect to said anode, a coil surrounding said envelope for producing a magnetic field parallel to the flow of electrons between said surfaces, a piezo-electric crystal directly connected between said surfaces for stabilizing the frequency of said oscillator, a resistance having high impedance to the oscillation frequency in shunt with said crystal, a connection from the midpoint of said resistance to said anode including in series a source of potential for maintaining said anode at a positive potential relative to said surfaces, a parallel tuned circuit of inductance and capacity in series with said source, said parallel tuned circuit being resonant to a frequency which is an even multiple of the fundamental frequency, and an output circuit coupled to said parallel tuned circuit.

16. An electron discharge device having within an envelope, a centrally located electron collecting element, a pair of cold surfaces capable of emitting electrons on impact oppositely disposed with respect to said electron collecting element and also located within said envelope, means for maintaining said electron collecting element at a potential which is positive with respect to said surfaces, and a frequency determining circuit of substantially uniformly distributed constants connected between said surfaces, said frequency determining circuit having a power factor lower than a tuned circuit consisting of equivalent concentrated constants.

17. An electron discharge device having within an envelope, a centrally located electron collecting element, a pair of cold surfaces capable of emitting electrons on impact oppositely disposed with respect to said electron collecting element and also located within said envelope, means for maintaining said electron collecting element at a potential which is positive with respect to said surfaces, and a frequency determining circuit connected between said surfaces, said frequency determining circuit having a resonant characteristic which is sharper than a tuned circuit having equivalent concentrated impedance elements.

18. An electron discharge device having within an envelope, a centrally located electron collecting element, a pair of cold surfaces capable of emitting electrons on impact oppositely disposed with respect to said electron collecting element and also located within said envelope, means for maintaining said electron collecting element at a potential which is positive with respect to said surfaces, a frequency determining circuit connected between said surfaces, said frequency determining circuit having a resonant characteristic which is sharper than a tuned circuit having equivalent concentrated impedance elements, and means for producing a magnetic field parallel to the flow of electrons between said surfaces.

19. The method of operating an electron discharge device oscillator which comprises creating an electron flow, directing said flow against a surface capable of emitting secondary electrons on impact, directing the resultant flow against a similar opposed surface, repeating such impacts at predetermined intervals between opposed surfaces, stabilizing the frequency of oscillation at a fundamental frequency, and deriving oscillations from said oscillator of a frequency which is equal to twice the frequency of the fundamental.

20. In combination, an electron discharge device comprising an evacuated envelope containing a pair of surfaces capable of emitting electrons on impact, said surfaces being oppositely disposed with respect to a central anode, a resonant circuit coupled between said surfaces, and another resonant circuit coupled between said anode and said surfaces, and means for applying a positive potential to said anode relative to said surfaces.

21. In combination, an electron discharge device comprising an evactuated envelope containing a pair of surfaces capable of emitting electons on impact, said surfaces being oppositely disposed with respect to a central anode, a resonant circuit coupled between said surfaces, and another resonant circuit coupled between said anode and said surfaces, and means for applying a positive potential to said anode relative to said surfaces, one of said resonant circuits being tuned to a frequency which is an integral multiple of the frequency to which the other resonant circuit is tuned.

22. In combination, an electron discharge device comprising an evacuated envelope containing a pair of surfaces capable of emitting electrons on impact, said surfaces being oppositely disposed with respect to a central anode, a piezo electric crystal circuit coupled between said surfaces, an output circuit coupled between said anode and said surfaces, and means for applying a positive potential to said anode relative to said surfaces.

23. In combination, an electron discharge device comprising an evacuated envelope containing a pair of surfaces capable of emitting electrons on impact, said surfaces being oppositely disposed with respect to a central anode, a piezo electric crystal circuit coupled between said surfaces, an output circuit coupled between said anode and said surfaces, and means for applying a positive potential to said anode relative to said surfaces, said output circuit comprising a resonant circuit tuned to a frequency which is twice the frequency of the crystal.

24. In combination, an electron discharge device comprising an evacuated envelope containing a pair of surfaces capable of emitting electrons on impact, said surfaces being oppositely disposed with respect to a central anode, means for applying alternating current energy of a predetermined frequency between said surfaces, a resonant circuit coupled between said anode and a point on said means, said resonant circuit being tuned to a frequency which is a harmonic of said predetermined frequency, and means for applying a positive potential to said anode relative to said surfaces.

25. The method of operating an electron discharge device oscillator having a pair of surfaces capable of emitting secondary electrons on impact disposed on opposite sides of an electrode, which comprises creating an electron flow between said surfaces, applying alternating current energy of a fundamental frequency between said surfaces, whereby such impacts are repeated at predetermined intervals between said surfaces, and exciting said intermediate electrode at a harmonic of said fundamental frequency by the electrons of said flow.

26. In combination, an electron discharge device comprising an evacuated envelope containing a pair of surfaces capable of emitting electrons on impact, said surfaces being oppositely disposed with respect to a central electron collecting element, a resonant circuit comprising a section of line having substantially uniformly distributed inductance and capacitance and whose length is equal to an odd multiple including unity of half the length of the fundamental wave, a connection from the center of said line to said element, individual connections from said surfaces to points on said line oppositely disposed with respect to the center thereof, and means for applying a positive potential to said element relative to said surfaces.

27. An oscillation generator comprising a pair of opposed cathodes, means for causing a cloud of electrons to oscillate between said cathodes and impact thereon with velocity sufficient to maintain the density of said cloud by the secondary electrons emitted by said impacts, and a piezo-electric crystal coupled to said cathodes for stabilizing the frequency of oscillation.

28. In combination, an electron discharge device oscillator comprising an evacuated envelope containing an anode, and a pair of surfaces capable of emitting electrons on impact oppositely disposed with respect to said anode, means including an inductance coil for applying alternating current potentials to said surfaces of such value and frequency that when one surface is at a positive potential the other surface is at a negative potential both relative to said anode, a connection from said anode substantially to the midpoint of said inductance coil, and a ring on each side of said anode located between said anode and the adjacent surface, and means for applying potentials to said rings to control the time of flight of the electrons between said surfaces.

29. In an electron multiplier structure wherein an electron cloud is oscillated against and away from a surface to produce secondary emission therefrom upon impact therewith, the method of operation which comprises stabilizing the frequency of impact at a fundamental frequency, and deriving energy from said electron cloud of a frequency which is an integral multiple of the fundamental frequency.

CHARLES H. BROWN.
WALTER van B. ROBERTS.